M. W. GROOM.
APPARATUS FOR COOLING FRUITS.
APPLICATION FILED SEPT. 4, 1907.
939,685.
Patented Nov. 9, 1909.
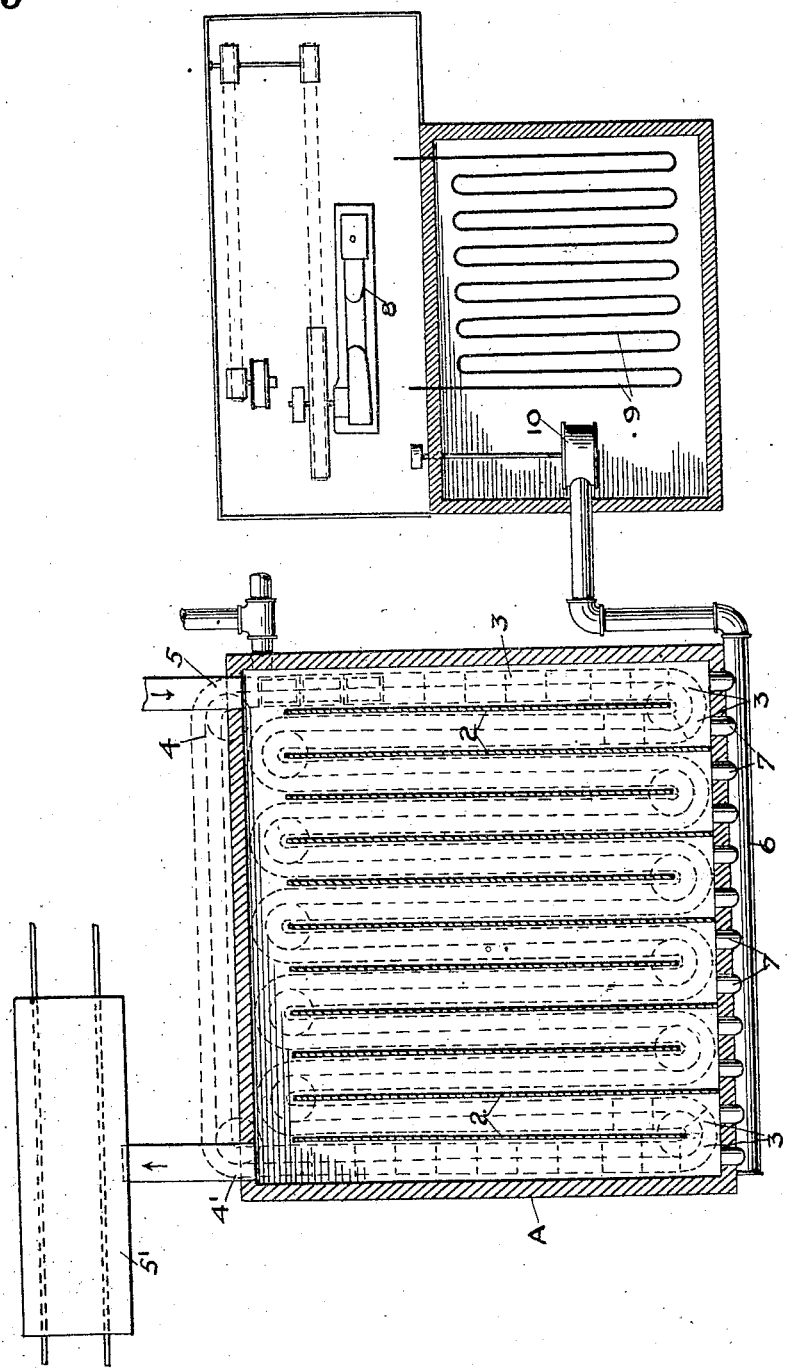
WITNESSES
INVENTOR
Marshall W. Groom
by Attorney
Geo. H. Strong.

UNITED STATES PATENT OFFICE.

MARSHALL W. GROOM, OF SAN JOSE, CALIFORNIA.

APPARATUS FOR COOLING FRUITS.

939,685.

Specification of Letters Patent.   Patented Nov. 9, 1909.

Application filed September 4, 1907.  Serial No. 391,320.

*To all whom it may concern:*

Be it known that I, MARSHALL W. GROOM, citizen of the United States, residing at San Jose, in the county of Santa Clara and State of California, have invented new and useful Improvements in an Apparatus for Cooling Fruits, of which the following is a specification.

My invention relates to an apparatus for cooling fresh fruits prior to their loading into cars for shipment.

Vast quantities of fresh fruits are shipped yearly from California to eastern markets, and in order to preserve them during transit they are loaded into refrigerator cars. Generally this fruit is loaded into the cars while the fruit is still very warm, having been in the orchards under the blazing sun and then packed in hot packing houses, and no general attempt has been made to cool the fruit off before loading. A car loaded with this hot fruit will rapidly melt the ice, and sometimes before a car has gone a hundred miles the ice supply will be exhausted; and while the fruit is temporarily cooled off it will not remain cool, and will soon spoil unless the car is re-iced.

As rapid handling and rapid transit are essential to long transportation of perishables, like fruit, it is manifestly impractical to try and store the fruit in an ice-house or ordinary cooling chamber for any length of time. Moreover, the season is very short, and the number of cars that a single shipping point may send out loaded with fruit often runs into the thousands.

I have devised a system by which the fruit, after it has been boxed and is ready for shipment, can be run through a cooling apparatus, chilled to a proper degree, and loaded into the cars at the rate of a car-load an hour.

The figure illustrates a part sectional view and part plan view of a fruit cooling apparatus embodying my invention.

A represents the cooling or chilling apparatus which may be divided by longitudinal partitions 2, and any desired number of runways 3. An endless conveyer 4 having a receiving and a discharge portion exterior to the inclosure A, is adapted to traverse the successive runways or compartments 3. The fresh fruit, suitably boxed, is delivered on to the conveyer and into the apparatus at 5, thence it is carried down one runway, and up the next, down a third, and so on, until finally discharged at 4' directly into the car 5'.

At the end of the apparatus opposite to the inlet 5, is arranged a cold air pipe 6 having a series of nozzles or blast outlets 7 discharging down the length of each runway or compartment 3. The cold air blast is received from any suitable source of supply. In a practical apparatus built for expeditiously handling large quantities of fruit, an air compresser 8 is arranged to force air through the ammonia coils 9, and the air is thence forced by a fan 10 through the cold air blast pipe 6.

As the fruit approaches the cold blast, as it does in alternate runways, owing to the sinuosities of the conveyer 4, it is cooled off on one side. Passing into the alternate runways the fruit travels away from the air blast, and the boxes or baskets containing the fruit receive the air blast on the other side, so that all portions of a box of fruit become thoroughly chilled before it leaves the apparatus.

Manifestly, the speed of the conveyer and the number of turns which it makes inside the apparatus, will be such as to effect the desired results. The slower the travel, or the longer the travel of the fruit in the apparatus, the colder it will be when it is discharged into the car.

By this preliminary cooling the fruit is in good condition for a long trip, and the ice in the car will keep far longer than where it has to be used to reduce the temperature of the fruit to a point where it will keep.

Having thus described my invention, what I claim and desire to secure by Letters Patent is—

An apparatus for cooling fruit, which comprises a closed chamber divided by partitions into a series of runways, an endless conveyer having a receiving and a discharge portion outside said chamber, and with a sinuous portion traversing the successive runways, a cold air pipe having nozzles arranged to discharge into said runways, alternate of said nozzles discharging in a direction contrary to the travel of the conveyer, and the intermediate nozzles discharging in the same direction with the conveyer, and a source of cold air supply for said air pipe.

In testimony whereof I have hereunto set my hand in presence of two subscribing witnesses.

MARSHALL W. GROOM.

Witnesses:
GEO. H. KELLOGG,
H. L. CULVER.